United States Patent [19]

Ono

[11] Patent Number: 4,689,481
[45] Date of Patent: Aug. 25, 1987

[54] FOCUS ERROR DETECTOR AND OPTICAL HEAD USING THE SAME

[75] Inventor: Yuzo Ono, Tokyo, Japan

[73] Assignee: NEC Corporation, Tokyo, Japan

[21] Appl. No.: 744,598

[22] Filed: Jun. 14, 1985

[30] Foreign Application Priority Data

Jun. 14, 1984 [JP] Japan ............................ 59-122262
Apr. 5, 1985 [JP] Japan .............................. 60-72155

[51] Int. Cl.$^4$ ........................... G01J 1/20; G11B 5/09
[52] U.S. Cl. ........................................ 250/201; 369/45
[58] Field of Search ............... 250/201 DF; 369/44, 369/45, 46

[56] References Cited

U.S. PATENT DOCUMENTS 3,781,110 12/1973 Leitz et al. ................. 250/201 PF
3,833,769 9/1974 Compaan et al. ............ 250/201 DF
4,462,095 7/1984 Chen ................................... 369/46

Primary Examiner—Edward P. Westin
Assistant Examiner—Charles F. Wieland
Attorney, Agent, or Firm—Sughrue, Mion, Zinn, Macpeak, and Seas

[57] ABSTRACT

A focus error detector for an optical head utilizes a transmission type diffraction grating and an optical system for converging a beam issuing from a light source onto an object and converting light reflected from the object to a collimated beam to cause the collimated beam to become incident to the diffraction grating at a proper angle of incidence. A photodetector having a plurality of light-sensitive sections, is positioned relative to the grating such that it receives rays diffracted substantially from the grating in the direction of reflection of the diffraction grating. Photodetector data are used to calculate focus correction signals which are supplied to servo-mechanisms providing physical adjustments to the optical system.

14 Claims, 9 Drawing Figures

FOCUS ERROR DETECTOR AND OPTICAL HEAD USING THE SAME

BACKGROUND OF THE INVENTION

The present invention relates to a focus error detector and an optical head using the same and, more particularly, to an optical head applicable to a video disk, digital audio disk (compact disk), and optical disk usable as an external storage of a computer, as well as a focus error detector for applying focusing servo to such an optical head.

An optical head for use with a video disk, digital audio disk, optical disk associated with a computer as an external storage, and other optical disks may be constructed as shown in FIG. 1 by way of example. The optical head comprises a semiconductor laser 16 for emitting a laser beam 17, a collimating lens 18 for changing the laser beam 17 to a collimated beam, a polarizing beam splitter 19, a quarter-wave plate 20, and an objective 21 for converging the beam onto an optical disk surface 10. The optical head further comprises focusing error detector means and tracking error detector means. The focusing error detector means is made up of a critical angle prism 22, and four photodetectors 12–15. The prism 22 is arranged such that light reflected from the disk surface 10 and then turned by the objective 21 to a collimated beam becomes incident to the prism 22 via the beam splitter 19 at a critical angle relative to the reflecting surface of the prism 22. When the disk surface 10 is displaced relative to the focus 11 of the lens 21, the angle of incidence to the prism 22 and, therefore, the quantity of light incident to each of the photodetectors 12–15 is changed allowing the focusing error to be detected.

The problem with the focusing error detector included in the above-described optical head is that the prism which is a critical angle prism needs to have its three surfaces ground, i.e., incidence surface, reflection surface and emission surface, at the sacrifice of mass productivity and costs. An optical head using such a focusing error detector is naturally expensive.

SUMMARY OF THE INVENTION

It is therefore an object of the present invention to provide a focus error detector which is free from the above-discussed problem as well as an optical head using such a focus error detector.

A focus error detector of the present invention comprises a transmission type diffraction grating having a grating pitch d, an optical system for converging a beam issuing from a light source onto an object and converting light reflected from the object to a collimated beam to cause the collimated beam to become incident to the diffraction grating at an angle of incidence $\theta_i$ which is expressed as $$\theta_i = \sin^{-1}\left(\frac{\lambda}{d} - 1\right)$$

where $\lambda$ is a wavelength of the light, and a photodetector having a plurality of light-sensitive sections for receiving diffracted rays which are diffracted substantially in a direction of reflection of the diffraction grating. An amount displacement of the object from a point of convergence is detected in terms of photosignal levels which are incident to the respective light-sensitive sections of the photodetector.

Also, an optical head for irradiating an optical disk provided with a number of pits therein by a laser beam to read information out of the disk based on photosignals which are reflected from the disk of the present invention comprises a laser, a first optical system for converting a beam emitting from the laser to a collimated beam, a polarizing beam splitter for splitting the collimated beam to two light beams that are perpendicular to each other with respect to direction of polarization, a polarization converting element for converting polarization of the split beam from linear polarization to circular polarization, a second optical system for converging the circular polarization beam onto a surface of the optical disk, a transmission type diffraction grating arranged such that a linearly polarized beam perpendicular to the split beam in a direction of polarization and coming out as a result of passage of light reflected from the surface of the optical disk through the second optical system, the polarization converting element and the beam splitter has an angle of incidence $\theta_i$ which is produced by $$\theta_i = \sin^{-1}\left(\frac{\lambda}{d} - 1\right)$$

where $\lambda$ is a wavelength of the light and d is a pitch of the grating, a photodetector having a plurality of light-sensitive sections for receiving diffracted light which is diffracted substantially in a direction of reflection of the transmission type diffraction grating, and a focusing error detector for generating information representative of displacement of the surface of the optical disk from a point of convergence based on photosignal levels which are incident to the respective light-sensitive sections.

In accordance with a more specific feature of the present invention, the beam splitter comprises a transmission type diffraction grating which splits incident light into zeroth order diffracted light and first order diffracted light depending upon a direction of polarization of the incident light, the polarization converting element comprising a non-diffractive grating having a ratio of grating pitches to light wavelength, $\lambda/d$, which is not smaller than 2.

PRINCIPLE OF THE PRESENT INVENTION

Figure 1:
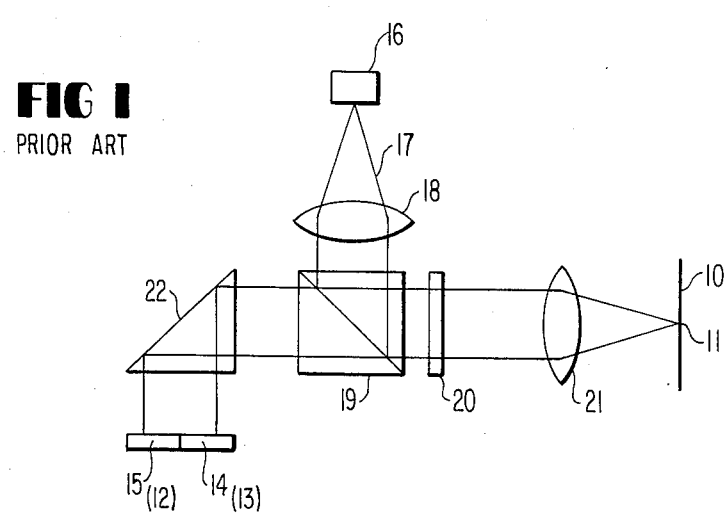
FIG. 1 is a section of an optical head equipped with focus error detector means which uses a conventional critical angle prism.
Figure 2:
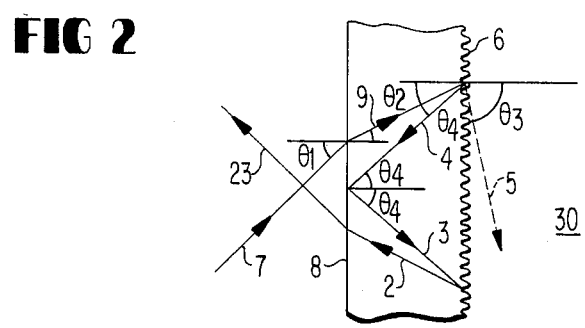
FIGS. 2 and 3 are sections each showing a transmission type diffraction grating applicable to focus error detection, together with a path along which light propagates.

Referring to FIG. 2, the principle of the focus error detector in accordance with the present invention is presented employing a relationship between incidence of light on a diffraction grating and diffraction of the light. It is to be noted that the diffraction grating is shown in an enlarged scale in order to show that 6 is the grating surface. A ray 7 is incident to a substrate surface 8 of the grating (parallel to the grating surface 6) at an angle of incidence $\theta_1$ as shown in the drawing. The incident ray 7 is refracted by the substrate surface. Assuming that the substrate has a refractive index n, Snell's law provides a refraction angle $\theta_2$ as represented by $$\sin \theta_1 = n \sin \theta_2 \qquad \text{Eq. (1)}$$

The refracted light 9 comes out of the grating to the air as a ray 5 as indicated by a dotted line after being diffracted by the grating surface 6 as expressed by $$n \sin \theta_2 + \sin \theta_3 = \lambda/d \qquad \text{Eq. (2)}$$

where $\lambda$ is a wavelength of the rays and d, apitch of the grating.

Substituting the Eq. (1) for the Eq. (2), $$\sin \theta_1 + \sin \theta_3 = \lambda/d \qquad \text{Eq. (3)}$$

Let $\lambda/d$ be greater than 1 (one). As the angle of incidence $\theta_1$ decreases from 90 degrees toward 0 degrees, the angle of diffraction $\theta_3$ increases. When the angle of incidence $\theta_1$ is $$\theta_1 = \sin^{-1}\left(\frac{\lambda}{d} - 1\right) \qquad \text{Eq. (4)}$$

the angle of diffraction $\theta_3$ is 90 degrees which does not allow the diffracted ray to come out to the air any longer. At this instant, there holds inside the substrate an equation $$n \sin \theta_2 + n \sin \theta_4 = \lambda/d \qquad \text{Eq. (5)}$$

Therefore, $n \sin \theta_4 = 1$ holds which provides a reflected diffracted ray 4. However, since $\sin \theta_4 = 1/n$, the diffracted ray 4 is totally reflected by the substrate surface 8 to become a reflected ray 3. The reflected ray 3 is in mirror-symmetry to the diffracted ray 4 and, hence, it turns to a reflected diffracted ray 2 at the grating surface 6. The ray 2 is refracted by the substrate surface 8 to be radiated to the air as a refracted ray 23. As described above, when the angle of incidence $\theta_1$ represented by the Eq. (4) is changed to set up a relation $\sin \theta_1 > (\lambda/d) - 1$, the diffracted ray 23 does not come out, and, instead, the diffracted ray 5 develops at the grating surface side. When $\sin \theta_1 < (\lambda/d) - 1$, the diffracted ray 23 come out but not the diffracted ray 5. Changes in the angle of incidence $\theta_1$, therefore, can be detected by sensing the intensity of the diffracted ray 23.

Figure 3:
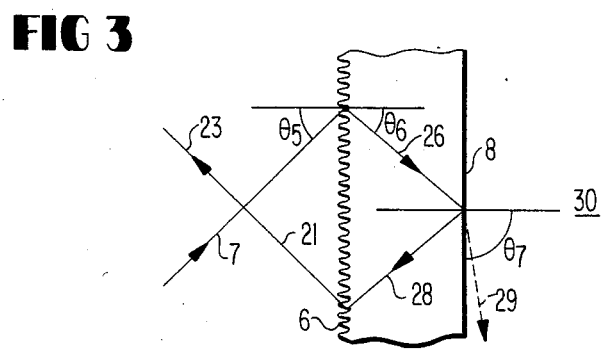

The same effect as described above is attainable even if the diffraction grating applicable to the present invention is positioned to have the grating surface at the front and the substrate surface at the rear. Specifically, as shown in FIG. 3, the ray 7 is incident to the grating surface 6 of the grating at an angle $\theta_5$. At the grating surface, the ray 7 is diffracted. Assuming that the substrate has a refractive index n, the angle of diffraction $\theta_6$ is expressed as $$\sin \theta_5 + n \sin \theta_6 = \lambda/d \qquad \text{Eq. (6)}$$

The diffracted ray 26 is refracted by the substrate surface 8 according to a condition $$n \sin \theta_6 = \sin \theta_7 \qquad \text{Eq. (7)}$$

The resulting refracted ray is labeled 29 and indicated by a dotted line in the drawing. Substituting the Eq. (7) for the Eq. (6), $$\sin \theta_5 + \sin \theta_7 = \lambda/d \qquad \text{Eq. (8)}$$

Again, the situation will be discussed on the assumption that $\lambda/d$ is greater than 1. As the angle of incidence $\theta_5$ decreases from 90 degrees toward 0 degrees, the angle of refraction $\theta_7$ increases. When the angle $\theta_5$ reaches $$\theta_5 = \sin^{-1}\left(\frac{\lambda}{d} - 1\right) \qquad \text{Eq. (9)}$$

the angle $\theta_7$ becomes 90 degrees with the result that the refracted ray is not radiated to the air and, instead, totally reflected by the substrate surface 8. The totally reflected ray 28 is rediffracted by the grating surface 6 to come out to the air as a diffracted ray 23. As described above, when $\sin \theta_5 > (\lambda/d) - 1$, the diffracted ray 23 does not come out and, instead, the diffracted ray 29 which is refracted by the substrate surface 8 comesout. When $\sin \theta_5 < (\lambda/d) - 1$, on the other hand, the diffracted ray 23 comes out but not the diffracted ray 29. Hence, changes in the angle of incidence $\theta_5$ can be detected by sensing the intensity of the diffracted ray 23. The above discussion will suffice to show that an angle of incidence could be detected if whether or not a diffracted ray comes out from a diffraction grating were known. The principle of operation which is provided by applying the above principle to a focusing error detector will be described later in conjunction with embodiments of the present invention.

DETAILED DESCRIPTION OF THE PREFERRED EMBODIMENTS

Figure 4:
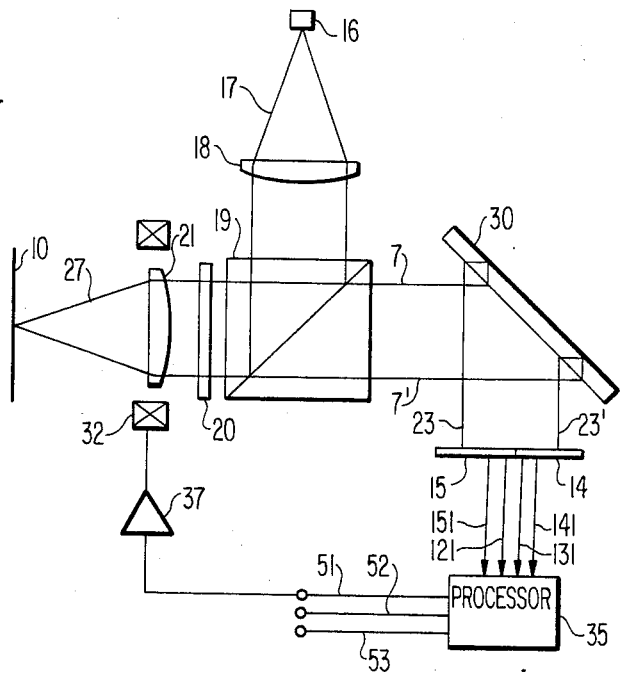
FIGS. 4 and 5 are sections of a first embodiment of the present invention, FIG. 4 showing a condition wherein a disk surface is aligned with a light converging point and FIG. 5 a condition wherein the former is misaligned with the latter.
Figure 5:
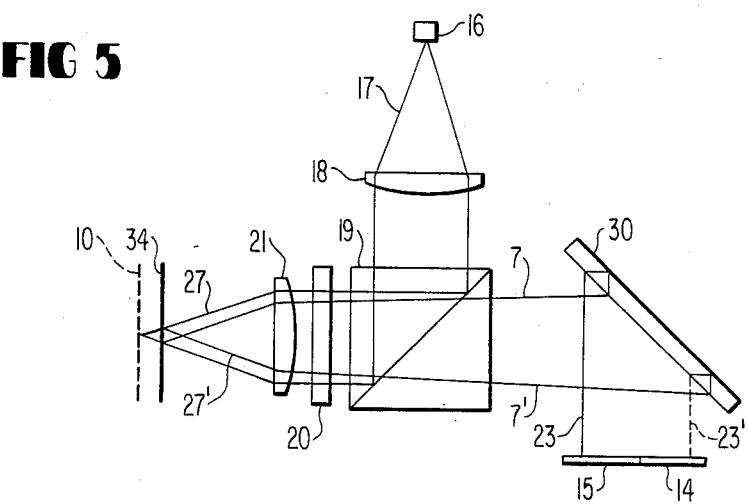

Referring to FIGS. 4 and 5, a preferred embodiment of the present invention is shown in sections. FIG. 4 shows a condition wherein the surface of an optical disk is aligned with the focus of an optical head, while FIG. 5 shows a condition wherein the former is misaligned with the latter. A beam 17 emitting from a laser diode 16 is converted through a collimating lens 18 to become a collimated beam, then reflected by a polarizing beam splitter 19, then changed by a quarter-wave plate 20 from linear polarization to circular polarization, and then converged by a converging lens 21 onto an optical disk surface 10 as converged light 27. So long as the light is converged accurately on the disk surface 10, light reflected from the disk surface 10 is transformed by the converging lens 21 into a collimated beam, and then converted by the quarter-wave plate 20 to have linear polarization which is at a right angle to the linear polarization of the incoming beam incident to the beam splitter 19 from the collimating lens 18. The beam coming out of the quarter-wave plate 20 is transformed through the beam splitter 19 to become a collimated beam 7 which then hits a diffraction grating 30. The angle of incidence to the grating 30 is selected to be slightly smaller than the angle at which diffracted ray shown in FIG. 3 begins to appear as previously stated, so that diffracted beam containing rays 23 and 23' appears. The beam containing rays 23 and 23' is received by a photodetector which is divided in four, i.e. photodetectors 12-15.

Figure 6:
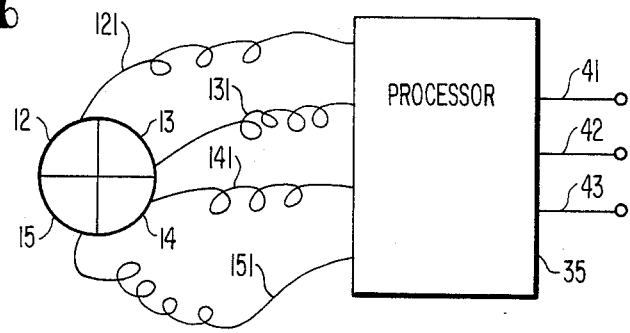
FIG. 6 shows light-sensitive surfaces of photodetectors shown in FIG. 4 in a plan view together with electrical connections adapted to lead outputs of the respective photodetectors to a processing unit, a disk surface being assumed to be in alignment with a light converging point.

The photodetectors 12-15 are shown in a plan view in FIG. 6 as seen from a side opposing their light-sensitive surfaces. The photodetectors 12-15 are arranged such that in the condition shown in FIG. 4, that is, when the optical disk surface is aligned with the focus of the converging lens 21 and tracking control is effected, the diffracted rays from the grating 30 evenly cover the four photodetectors 12-15. Stated another way, they are arranged such that the optical axis of the optical head extends through the center of the photodetectors 12-15. Therefore, a zero output develops at a focus error signal output terminal 51 of the processing unit, or processor, 35 which is adapted to compute a difference between the sum of outputs of the photodetectors 12 and 14 and that of the outputs of the photodetectors 13 and 15. The focus error signal is fed to an actuator 32 through a servo amplifier 37. Appearing at an output terminal 52 of the processor 35 is a value provided by subtracting the sum of outputs of the photodetectors 14 and 15 from that of outputs of the photodetectors 12 and 13, that value being representative of a tracking error if any. Further, the reference numeral 53 designates a signal output terminal where a sum of outputs of the photodetectors 12-15 appear.

FIG. 5 represents a condition in which the disk surface 10 is displaced from the position shown in FIG. 4 to a position labeled 34 in FIG. 5. For the simplicity of illustration, the processor 35 and the actuator for applying servo are omitted in FIG. 5. The light 27' reflected from the disk surface 34 is incident to the grating 30 after being turned by the converging lens 21 not to collimated light but to diverging light. Since the light incident to the grating 30 is divergent as mentioned, the upper half 7 of the light shown in FIG. 5 is incident to the grating 30 at a smaller angle than in the condition shown in FIG. 4 and, therefore, satisfies the condition for developing the diffracted ray 23. However, the lower half 7' of the same light is incident to the grating 30 at a greater angle than in the case of FIG. 4 and, therefore, fails to satisfy the condition concerned, with the result that no diffracted ray reaches the photodetectors.

Figure 7:
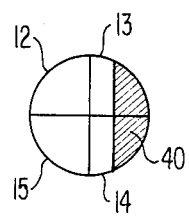
FIG. 7 is a view similar to FIG. 6 but showing a particular beam condition on the light-sensitive surfaces of the photodetectors which results from misalignment of the disk surface with the focus.

Under the above condition, the light-sensitive surfaces of the photodetectors 12-15 appear as shown in FIG. 7 as seen from the front. As shown, the diffracted ray does not reach the right half of the photodetectors 13 and 14 so that the latter remains dark as indicated by hatching 40. Where the disk surface 10 is displaced away from the focus opposite to the case shown in FIG. 5, the light reflected from the disk surface is converged by the lens 21 with the result that the angle of incidence of the light on the grating 30 fails to satisfy the diffraction condition, this time in the upper half of the light. This would leave part of the photodetectors 12 and 15 dark. It follows that an mount of displacement of the disk surface 10 from the focus can be known in terms of a magnitude of the signal appearing at the output 51 of the processor 35, and a direction of the displacement in terms of a sign of the signal. Hence, it is possible to apply focus servo by controlling an actuator 32 by means of the signal appearing at the output 51.

In this particular embodiment, the diffraction grating 30 is oriented in the manner shown in FIG. 3. Such is only illustrative, however, and may be replaced by the orientation shown in FIG. 2. To mention practical examples of numerical values associated with the grating, where $\lambda = 780$ nanometers and the angle of incidence is substantially 45 degrees, the Eq. (4) provides grating a pitch of 0.4569 microns. A grating with such a pitch can be readily produced using interference of two beams. Where the grating is to be directly recorded in photoresist, use may be made of a He-Cd laser whose wavelength is 441.6 nanometers so as to cause two beams to interfere with each other at equal angles of incidence 28.897 degrees. This kind of grating is suitable for mass-production.

Figure 8:
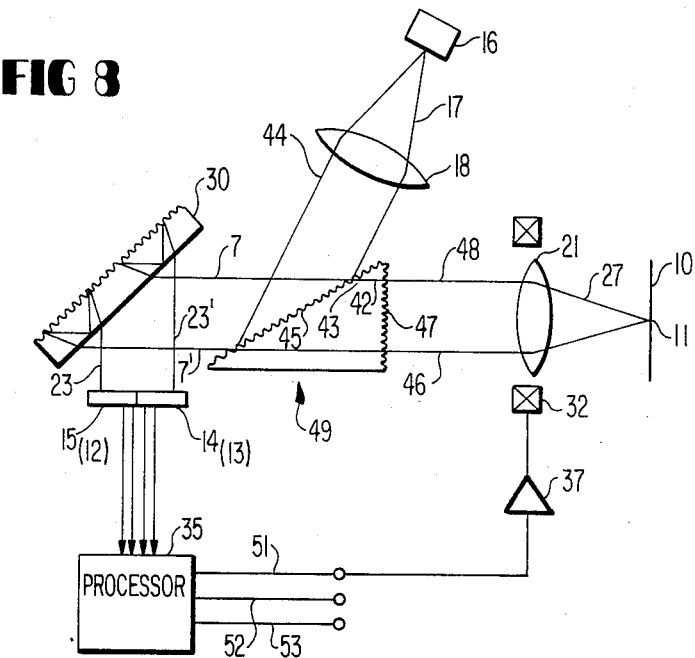
FIG. 8 is a section of another embodiment of the present invention.

Referring to FIG. 8, another embodiment of the optical head in accordance with the present invention is shown. In this particular embodiment, both the polarizing beam splitter and the means for converting the direction of polarization from linear to circular or from circular to linear are implemented using gratings 45 and 47. In addition, this embodiment differs from the previous one in that the two gratings 45 and 47 are provided on a single dielectric block 49, and in that the grating for detecting focussing errors is used in the orientation shown in FIG. 2. In FIG. 8, the same or similar structural elements as those of the first embodiment are designated by like reference numerals and detailed description thereof will be omitted. The block 49 which is shaped in a trigonal prism is provided with the grating 45 on its slanting surface and the grating 47 on one of the other two surfaces. The semiconductor laser 16 is oriented such that an electrical vector extends parallel to the grooves of the grating 45 and, in addition, the first order diffracted light developed by the grating 45 advances in the perpendicular direction of the optical disk surface 10.

Figure 9:
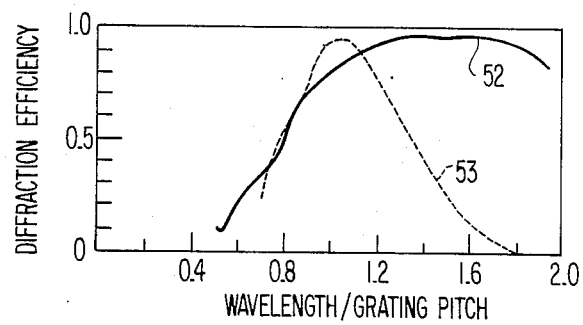
FIG. 9 shows curves representative of the first order diffraction efficiency of a transmission type diffraction grating which is applicable to the embodiment of FIG. 8 as a polarizing beam splitter.

As to the grating 45 which is of the transmission type and provided with relatively deep grooves, the diffraction efficiency differs from the case wherein the electrical vector of incident light extends parallel to the grooves to the case wherein it extends perpendicular to the grooves. In FIG. 9, the diffraction efficiency of the first order diffracted light is presented as a function of a ratio of wavelength $\lambda$ to grating pitch d, i.e. $\lambda/d$. Solid curve 52 shown in FIG. 9 is associated with a condition wherein the electrical vector is parallel to the grooves of grating 45, while broken curve 53 is associated with a condition wherein the former is perpendicular to the latter. As understood from the curves 52 and 53, a significant difference in diffraction efficiency is seen at the wavelength/grating pitch ratios ($\lambda/d$) of 1.6 and above, particularly 1.8 and above. Specifically, while most of the incident light having an electrical vector which extends parallel to the grating grooves is converted to the first order diffracted light, incident light whose electrical vector extends perpendicular to the grating grooves does not turn to the first order diffracted light and, instead, transmits straight as the zeroth order diffracted light. This kind of grating, therefore, fulfils the function of a polarizing beam splitter.

Concerning the dielectric grating 47 in FIG. 8 where the wavelength/grating pitch ($\lambda/d$) ratio is not smaller than 2, incident light having the used wavelength $\lambda$ is confined in the dielectric substrate and does not generate any diffracted ray; an electric vector parallel to the grating grooves and an electrical vector perpendicular to the same show refractive indexes which are different from each other. Hence, it is possible to set up a desired phase difference between the two electrical vectors by adequately selecting the groove depth and the material of the substrate. The phase difference of the grating 47 is designed such that the grating 47 functions as a quarter-wave plate. For details of such a quarter-wave plate, a reference may be made to D.C. Flanders "Submicrometer periodicity gratings as artificial anisotropic dielectrics", Applied Physics Letters, Vol. 42, No. 6 (1983), pp. 492-493.

Referring to FIG. 8 again, the beam 17 from the laser 16 is transmitted through the collimating lens 18 to become a collimated beam 44 and, then, incident to the grating, or beam splitter, 45. Since the orientation of the laser 16 is such that the electrical vector of incident light extends parallel to the grooves of the grating 45, the beam 44 incident to the grating 45 turns to the first order diffracted light 42 and reaches the grating, or quarter-wave plate, 47. The grating 47 is a high-density grating which is non-diffractive and provided with a ratio $\lambda/d$ not smaller than 2 and, hence, it gives a phase difference between beams propagating perpendicular to each other with the result that the incident linear polarized light is converted to circular polarized light 48. The beam 48 is converged by the converging lens 21 to a point 11 on the disk surface 10. Light reflected from the disk surface 10 is again transmitted through the lens 21 to be converted by the quarter-wave retardation grating 47 to a linearly polarized beam. Consequently, a beam whose electrical vector is perpendicular to the grooves of the grating 45 hits the grating 45, resulting in a diffraction efficiency which is substantially zero. The beam, therefore, is turned to the zeroth order diffracted rays 7 and 7' which are then incident to the critical angle grating 30. This grating 30 causes the incoming rays to undergo critical angle diffraction and total reflection two times. The diffracted rays 23 and 23' coming out of the grating 30 is incident to the photodetectors 12-15. When the disk surface 10 is displaced along the optical axis to cause a focusing error, the beam incident to the grating 30 becomes unparallel so that the rays reached the photodetectors 12 and 15 and those incident to the photodetectors 13 and 14 are asymmetrical to each other in the right-and-left direction. The resulting differential signal represents a focusing error. A tracking error, on the other hand, is indicated by a differential signal associated with the photodetectors 12 and 13 and the photodetectors 14 and 15.

The various gratings included in the arrangement of FIG. 8, as described in relation to the manufacture of the grating 30, may be prepared by providing it on photoresist, then producing a metal mold by nickel electroforming, and then molding a plastic by compression, injection or like technology. Such allows the desired grating to be manufactured economically on a quantity basis using a plastic. Another possible method is etching glass surfaces by photolithgraphy.

The polarizing beam splitter which is implemented by the diffraction grating 45 in the illustrative embodiment is suitable for mass production and, therefore, economical, compared to the beam splitter shown in FIGS. 4 and 5 which needs to be polished over its five surfaces because prisms each being coated with a polarizing multi-layer film are evaporated. Further, while the embodiment shown in FIGS. 4 and 5 uses a quarter-wave plate which is produced by polishing expensive quartz to a predetermined thickness, the embodiment shown in FIG. 8 substitutes a grating structure for such a quarter-wave plate, further enhancing mass-productivity.

In summary, it will be seen that the present invention provides a focus error detector and an optical head which are economical and excellent in mass-productivity. In addition, the focus error detector eliminates the need for a prism and, thereby, attains a light-weight construction which leads to a light-weight optical head.

What is claimed is:

1. A focus error detector comprising:

a transmission type diffraction grating having a grating pitch d;

an optical system for converging a beam emitting from a light source onto an object and converting light reflected from said object to a collimated beam to cause the collimated beam to become incident to said diffraction grating at an angle of incidence $\theta_i$ which is expressed as $$\theta_i = \sin^{-1}\left(\frac{\lambda}{d} - 1\right)$$

where $\lambda$ is a wavelength of the light; and a photodetector having a plurality of light-sensitive sections for receiving diffracted rays which are diffracted substantially in a direction of reflection of the diffraction grating;

whereby the amount of displacement of the object from a point of convergence of light beams on its surface is detected in terms of a change in magnitude of the difference among photosignal levels of the diffracted rays which are incident to said respective light-sensitive sections of said photodetector.

2. An optical head for irradiating an optical disk provided with a number of pits therein by a laser beam to read information out of the disk based on photosignals which are reflected from the disk, comprising:

a laser;

a first optical system for converting a beam emitting from said laser to a collimated beam;

polarizing beam splitter means for splitting the collimated beam to two light beams that are perpendicular to each other in a direction of polarization;

polarization converting means for converting polarization of the split beam from linear polarization to circular polarization;

a second optical system for converging the circular polarization beam onto a surface of the optical disk;

a transmission type diffraction grating arranged such that a linearly polarized beam perpendicular to the split beam in a direction of polarization and coming out as a result of passage of light reflected from the surface of the optical disk through said second optical system, said polarization converting means, and said beam splitter means has an angle of incidence $\theta_1$ which is produced by $$\theta_i = \sin^{-1}\left(\frac{\lambda}{d} - 1\right)$$

where $\lambda$ is a wavelength of the light and d is a pitch of the grating;

a photodetector having a plurality of light-sensitive sections for receiving diffracted light which is diffracted substantially in a direction of reflection of the transmission type diffraction grating; and focusing error detecting means for generating information representative of displacement of the surface of the optical disk from a point of convergence of light beams on its surface based on photosignal levels which are incident to said respective light-sensitive sections.

3. An optical head as claimed in claim 2, wherein the beam splitter means comprises a transmission type diffraction grating which splits incident light into zeroth order diffracted light and first order diffracted light depending upon a direction of polarization of the incident light, the polarization converting means comprising a non-diffractive grating having a ratio of a grating pitch to light wavelength, $\lambda d$, which is greater than or equal to 2.

4. A focus error detector as claimed in claim 1, further comprising:

focus means attached to a portion of said optical system for facilitating positional adjustment of said portion of said optical system in relation to said object, said positional adjustment being in response to said change in magnitude of the difference among photosignal levels which are incident to said respective light sensitive sections of said photodetector.

5. A focus error detector as claimed in claim 1, further comprising:

focus means for facilitating positional adjustment of said object in relation to said optical system, said positional adjustment being in response to said change in magnitude of the difference among photosignal levels which are incident to said respective light-sensitive sections of said photodetector.

6. An optical head as claimed in claim 2, further comprising:

focus means attached to a portion of said second optical system to facilitate positional adjustment of said portion of said second optical system in relation to said surface of said optical disk, said positional adjustment being in response to said information from said focusing error detecting means.

7. An optical head as claimed in claim 2, further comprising:

focus means for facilitating positional adjustment of said optical disk in relation to said second optical system, said postional adjustment being in response to said information from said focusing error detecting means.

8. An optical head for irradiating an optical disk provided with a number of pits therein by a laser beam to read information out of the disk based on photosignals which are reflected from the disk, comprising:

laser means for emitting a light beam;

an optical system for converging said beam onto the surface of an optical disk and converting light reflected from said optical disk to a collimated beam, said optical system being including at least one lens, and first and second diffraction gratings formed on two sides of a trigonal block;

a third diffraction grating of the transmission type for receiving and reflecting said collimated beam, said third diffraction grating having a grating pitch d and receiving said collimated beam at an angle of incident $\theta_1$ which is expressed $$\theta_i = \sin^{-1}\left(\frac{\lambda}{d} - 1\right)$$

where $\lambda$ is a wavelength of the light; and a photodetector having a plurality of light-sensitive sections for receiving said reflected collimated beam, whereby the amount of displacement of the surface of said optical disk from a point of convergence of said beam is detected in terms of the difference in magnitude between the photosignal levels received by said respective light-sensitive sections of said photodetector.

9. An optical head as claimed in claim 8, further comprising:

focus means attached to a portion of said optical system to facilitate positional adjustment of said portion of said optical system in relation to said surface of said optical disk, said positional adjustment being in response to the difference in magnitudes between the photosignal levels received by said respective light-sensitive sections of said photodetector.

10. An optical head as claimed in claim 8, further comprising:

focus means for facilitating positional adjustment of said surface of said optical disk in relation to said optical system, said positional adjustment being in response to the difference in magnitudes between the photosignal levels received by said respective light-sensitive sections of said photodetector.

11. A focus error detector comprising:

an optical system for converging a beam emitting from a light source onto an object and converting light reflected from said object to a collimated beam;

a transmission type diffraction grating for receiving and reflecting said collimated beam, said transmission type diffraction grating having a grating pitch d and receiving said collimated beam at an angle of incident $\theta_1$ which is expressed as $$\theta_i = \sin^{-1}\left(\frac{\lambda}{d} - 1\right)$$

where $\lambda$ is a wavelength of the light; and a photodetector having a plurality of light-sensitive sections for receiving said reflected collimated beam, whereby the amount of displacement of the object from a point of convergence of light beams on its surface is detected in terms of the difference in magnitudes between the photosignal levels received by said respective light-sensitive sections of said photodetector.

12. An optical head for irradiating an optical disk provided with a number of pits therein by a laser beam to read information out of the disk based on photosignals which are reflected from the disk, comprising:
- a laser;
- a focus error detector comprising:
    - a transmission type diffraction grating having a grating pitch d;
    - an optical system for converging a beam from said laser onto an object and converting light reflected from said object to a collimated beam to cause the collimated beam to become incident to said diffraction grating at an angle of incidence $\theta_1$ which is expressed as $$\theta_i = \sin^{-1}\left(\frac{\lambda}{d} - 1\right)$$

where $\lambda$ is a wavelength of the light; and
- a photodetector having a plurality of light-sensitive sections for receiving diffracted rays which are diffracted substantially in a direction of reflection of the diffraction grating;
- whereby the amount of displacement of the object from a point of convergence of light beams on its surface is detected in terms of a change in magnitude of the difference among photosignal levels of the diffracted rays which are incident to said respective light-sensitive sections of said photodetector.

13. A focus error detector comprising:
- a transmission type diffraction grating having a grating pitch d;
- an optical system for converging a beam emitting from a light source onto an object and converting light reflected from said object to a collimated beam to cause the collimated beam to become incident to said diffraction grating at an angle of incidence $\theta_1$ which is expressed as $$\theta_i = \sin^{-1}\left(\frac{\lambda}{d} - 1\right)$$

where $\lambda$ is a wavelength of the light and
- a photodetector having a plurality of light-sensitive sections for receiving diffracted rays which are diffracted substantially in a direction of reflection of the diffraction grating;
- wherein a comparison of the light magnitudes received by the respective light-sensitive sections is used as an indication of the focusing position of said object in relation to said converged beam.

14. A focus error detector comprising:
- a transmission type diffraction grating having a grating pitch d;
- an optical system for converging a beam emitting from a light source onto an object and converting light reflected from said object to a collimated beam to cause the collimated beam to become incident to said diffraction grating at an angle of incidence $\theta_i$ which is expressed as $$\theta_i = \sin^{-1}\left(\frac{\lambda}{d} - 1\right)$$

where $\lambda$ is a wavelength of the light; and
- a photodetector having a plurality of light-sensitive sections for receiving diffracted rays which are diffracted substantially in a direction of reflection of the diffraction grating;
- whereby the amount of displacement of the object from a point of convergence of light beams on its surface is detected in terms of the difference in magnitudes between the photosignal levels of the diffracted rays which are incident to said respective light-sensitive sections of said photodetector.

* * * * *

UNITED STATES PATENT AND TRADEMARK OFFICE
CERTIFICATE OF CORRECTION

PATENT NO. : 4,689,481

DATED : August 25, 1987

INVENTOR(S) : ONO

It is certified that error appears in the above-identified patent and that said Letters Patent is hereby corrected as shown below:

COLUMN 9, LINE 2    Delete "$\theta_1$" and insert --$\theta_i$;

COLUMN 9, LINE 28   Delete "$\lambda d$" and insert --$\lambda/d$--

COLUMN 10, LINE 11  Delete "$\theta_1$" and insert --$\theta_i$--;

COLUMN 10, LINE 54  Delete "$\theta_1$" and insert --$\theta_i$--;

COLUMN 11, LINE 14  Delete "$\theta_1$" and insert --$\theta_i$--;

COLUMN 11, LINE 41  Delete "$\theta_1$" and insert --$\theta_i$--;

COLUMN 12, LINE 6   After "light" insert --;--.

Signed and Sealed this

Eighteenth Day of October, 1988

Attest:

DONALD J. QUIGG

*Attesting Officer*   *Commissioner of Patents and Trademarks*